United States Patent
Grossetete et al.

(10) Patent No.: US 11,681,149 B2
(45) Date of Patent: Jun. 20, 2023

(54) METHOD AND DEVICE FOR CONTROLLING THE POSITIONING OF A MOUNTED INFORMATION DISPLAY DEVICE

(71) Applicant: THALES, Courbevoie (FR)

(72) Inventors: Matthieu Grossetete, Mérignac (FR); Siegfried Rouzes, Mérignac (FR); David Deceneux, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/557,589

(22) Filed: Dec. 21, 2021

(65) Prior Publication Data
US 2022/0206305 A1 Jun. 30, 2022

(30) Foreign Application Priority Data
Dec. 28, 2020 (FR) ..................... 20 14178

(51) Int. Cl.
*G02B 27/01* (2006.01)

(52) U.S. Cl.
CPC ....... *G02B 27/0179* (2013.01); *G02B 27/017* (2013.01); *G02B 2027/0198* (2013.01)

(58) Field of Classification Search
CPC .............. G02B 27/0179; G02B 27/017; G02B 2027/0198; G02B 2027/0138; G02B 2027/014; G02B 27/0172; G02B 2027/0141; G06F 3/011; G01C 23/00; G01C 21/1656
See application file for complete search history.

(56) References Cited

U.S. PATENT DOCUMENTS

| 5,645,077 A | * | 7/1997 | Foxlin | A61B 5/1114 600/595 |
| 5,978,715 A | * | 11/1999 | Briffe | G01C 23/00 701/16 |

(Continued)

FOREIGN PATENT DOCUMENTS

EP 3 073 285 A1 9/2016

OTHER PUBLICATIONS

French Search Report, from the French Patent Office in counterpart French Application No. 2014178, dated Sep. 20, 2021.

*Primary Examiner* — Dmitriy Bolotin
(74) *Attorney, Agent, or Firm* — ArentFox Schiff LLP

(57) ABSTRACT

This method, implemented in a mounted information display device, which incorporates a main sensor and an inertial sensor, and which determines the positioning by a hybrid inertial method including determining a calculated position by a main method using data acquired by the main sensor and determining a succession of estimated positions using the calculated position and data acquired by the inertial sensor, includes: obtaining at a first calculation time instant T1 a first estimated position of the device at a reference time instant, calculated by the hybrid inertia method; obtaining at a second time instant T2 a second estimated position of the device at the same reference time instant, calculated by the main method; comparing a difference between the first and second positions and a tolerance threshold; and, if the difference is less than the threshold, validating the positioning calculation by the hybrid inertial method, otherwise raising an alert.

10 Claims, 4 Drawing Sheets

(56) References Cited

U.S. PATENT DOCUMENTS

| | | | | |
|---|---|---|---|---|
| 6,377,401 | B1* | 4/2002 | Bartlett | G06F 3/0304 |
| | | | | 359/630 |
| 6,474,159 | B1* | 11/2002 | Foxlin | A61B 5/1114 |
| | | | | 73/488 |
| 7,640,106 | B1* | 12/2009 | Stokar | G06F 3/017 |
| | | | | 702/92 |
| 8,761,434 | B2* | 6/2014 | Marks | A63F 13/22 |
| | | | | 382/103 |
| 8,953,154 | B2* | 2/2015 | Galea | A61B 5/1121 |
| | | | | 356/138 |
| 11,127,215 | B1* | 9/2021 | Narvaez | G09G 3/001 |
| 11,393,109 | B2* | 7/2022 | Todd | G06T 7/74 |
| 2008/0048931 | A1 | 2/2008 | Ben-Ari | |
| 2009/0043504 | A1* | 2/2009 | Bandyopadhyay | H04W 4/33 |
| | | | | 701/469 |
| 2009/0085807 | A1* | 4/2009 | Anderson | H01Q 7/08 |
| | | | | 343/788 |
| 2011/0112996 | A1* | 5/2011 | Tu | A63F 13/428 |
| | | | | 706/54 |
| 2012/0249807 | A1* | 10/2012 | Sugden | G06T 7/73 |
| | | | | 348/207.1 |
| 2016/0035139 | A1* | 2/2016 | Fuchs | G02B 27/0093 |
| | | | | 345/633 |
| 2016/0282936 | A1* | 9/2016 | Larson | G01S 5/16 |
| 2020/0082629 | A1* | 3/2020 | Jones | G02B 27/0172 |
| 2022/0206305 | A1* | 6/2022 | Grossetete | G01C 21/1656 |
| 2022/0276704 | A1* | 9/2022 | Border | G09G 5/10 |

\* cited by examiner

METHOD AND DEVICE FOR CONTROLLING THE POSITIONING OF A MOUNTED INFORMATION DISPLAY DEVICE

This application claims priority from French Patent Application No. 20 14178 filed Dec. 28, 2020, the entire disclosure of which is incorporated by reference herein.

FIELD OF THE INVENTION

The present invention relates to a method for controlling the positioning, in a reference frame, of a mounted information display device, equipped with at least one main sensor and at least one inertial sensor, and a related positioning control device.

The invention lies in the field of augmented reality applied in safety-critical applications, in particular in the field of avionics.

More generally, the invention has applications in any safety-critical field implementing a user-mounted information display device.

BACKGROUND OF THE INVENTION

Mounted information display devices have been developed for various applications. Such devices are also called head-up display devices, and include for example helmets with visor/screen mounted on the head of the user known by the acronym HMD for "Head Mounted Display", which make it possible to display, either on a screen placed in front of the eyes of the user or on glasses placed in front of the eyes of the user, additional information on images visible to the user, whether it be the environment of the user visible in transparency or virtual/reconstructed images.

In the field of avionics, the use of a mounted display device presents advantages, as it allows displaying information and piloting symbols in front of the eyes of an aircraft pilot, thus increasing ergonomics and reducing the cognitive load of piloting. Indeed, thanks to such a device, the display of information follows the movement of the head of the pilot, and consequently the pilot does not need to move his head to monitor various piloting indicators, for example on an instrument panel visible in the "head down" position. Indeed, thanks to such a head-mounted display device, it is possible, for example, to show piloting information by symbols whose positioning is in conformity with reality (for example, representation in the head-mounted display device of the horizon line belonging to the local terrestrial reference frame by drawing a synthetic line). It is also possible to adapt the density of information perceived by the user according to his head position in relation to the geometry of the wearer and to the operational needs (some information can thus be permanently displayed in the field of view of the user, others can be displayed only in the axis of the wearer for example according to the criticality of the information in relation to the need).

Nevertheless, in this field, the placement of the information displayed on the screen, and the superposition between complementary information on the real images are critical. For example, the symbols to be displayed are critical symbols showing the behavior of the aircraft (attitude, altitude, speed, etc.), it is necessary that the information shown in superimposition on the real images is in the field of view of the pilot. In order to achieve a precise placement, it is necessary to determine, with a good accuracy, the orientation of a reference frame related to the mounted device with respect to a reference frame, for example related to the cockpit of the aircraft.

In the state of the art, methods are known for tracking the position, and in particular the orientation, of an object, in particular of a mounted display device, in a reference frame, based on inertial sensors. Tracking methods based on inertial sensors are fast, but the accuracy is not sufficient for safety-critical applications.

Position tracking methods are also known based on processing images acquired by an optical camera with respect to spatial markers placed at known positions in a reference frame. Controlling the positioning and tracking methods based on image processing are more accurate, but the processing time is longer.

Hybrid inertia methods are known, for example opto-inertial or magneto-inertial, which combine data from a first sensor, called the main sensor, for example an optical sensor or a magnetic sensor, and data from second, inertial sensors, to calculate the position and orientations updated at high frequency by the inertial data. An additional prediction calculation can be performed, for example using Kalman filtering to perform predictions and decrease latency in the experience of the user. For example, the document U.S. Pat. No. 7,231,063 B2 describes a method of tracking the position/orientation of a mounted device using an opto-inertial position tracking method.

Such methods are faster due to the use of inertial hybridization, and optionally the use of prediction, but it is not easy to guarantee the integrity of positioning provided by such methods. However, it is necessary to guarantee the integrity for the implementation of such methods in safety-critical applications.

The purpose of the invention is to remedy the disadvantages of the prior art by proposing a method and a device for controlling the positioning of a mounted information display device.

SUMMARY OF THE INVENTION

To this end, the invention proposes a method for controlling the positioning of a mounted information display device equipped with at least one main sensor and at least one inertial sensor, the control of the positioning implementing a hybrid inertial method including a position calculated by a main position calculation method using data acquired by the said at least one main sensor and a determination of a succession of estimated positions using a position calculated by the main position calculation method and data acquired by the said at least one inertial sensor, including steps implemented by a calculation processor of:

obtaining a first estimated position of the said device at a reference time instant, the first estimated position being calculated by the hybrid inertial method, the first estimated position being obtained at a first calculation time instant T1, and storing the said first estimated position in relation to the said reference time instant obtaining a second estimated position of the said device at the same reference time instant, calculated by the said main position calculation method, the second position being obtained at a second time instant T2 subsequent to the first time instant T1, following the obtaining of the said second estimated position, comparing a difference between the said first estimated position and the said second estimated position to a predetermined tolerance threshold, and if the difference is less than the said tolerance threshold, validation of the positioning calculation by the said hybrid inertial method, if the difference is greater than the said tolerance threshold, raising an alert.

Advantageously, the method for controlling the positioning of a mounted information display device makes it possible to validate a first position of the mounted validation device at a reference time instant, calculated by a hybrid inertia method, by comparison with a second position at the same reference time instant, obtained by a main position calculation method, which is more precise than the hybrid inertia method.

Advantageously, the control of the positioning of the mounted display device is thus made compatible with safety-critical applications.

The method for controlling the positioning of a mounted information display device according to the invention may also present one or more of the following features, taken independently or in any technically conceivable combination:

- each of the said first estimated position and second estimated position includes an orientation of a reference frame related to the information display device mounted in the reference frame expressed by a vector of angular values;
- the difference between the first estimated position and the second estimated position is equal to a norm of a rotation matrix between a first angular value vector representative of the first estimated position and a second angular value vector representative of the second estimated position;
- each of the said first estimated position and second estimated position includes a translation of the center of a reference frame related to the mounted information display device in the reference frame expressed by a translation vector;
- acquisition of a succession of first estimated positions and related first time instants, and storage of the said first estimated positions and of the said related first time instants in a buffer memory;
- the main sensor being an image sensor, the main position calculation method implements a processing of images acquired by the image sensor, including an analysis of at least one image of a sequence of images acquired by the image sensor and a position calculation as a function of previously recorded positions of spatial markers previously arranged in the reference frame;
- the main sensor being an electromagnetic wave sensor, the main position calculation method implements a position calculation by measuring electromagnetic fields with respect to a calibrated transmitting antenna positioned in the reference frame
- a temporal prediction for predicting a position of the mounted information display device at a time instant corresponding to a physical data acquisition instant of the main sensor from a position calculated by the hybrid inertia calculation method.

According to another aspect, the invention relates to a computer program including executable code instructions which, when executed by a programmable electronic device, implement a method for controlling the positioning of a mounted information display device in accordance with the preceding method.

According to yet another aspect, the invention relates to a device for controlling the positioning of a mounted information display device equipped with at least one main sensor and at least one inertial sensor, the control of the positioning implementing a hybrid inertia method including a position calculation by a main position calculation method using data acquired by the said at least one main sensor and a determination of a succession of estimated positions using a position calculated by the main position calculation method and data acquired by the said at least one inertial sensor including a calculation processor configured to implement:

- a module for obtaining a first estimated position of the said device at a reference time instant, the first estimated position being calculated by the hybrid inertia method, the first estimated position being obtained at a first calculation time instant T1, and storing the said first estimated position in relation to the said reference time instant,
- a module for obtaining a second estimated position of the said device at the same reference time instant, calculated by the said main position calculation method, the second position being obtained at a second time instant T2 subsequent to the first time instant T1,
- a validation module configured to, following the obtaining of the said second estimated position, compare a difference between the said first estimated position and the said second estimated position with a predetermined tolerance threshold, and if the difference is less than the said tolerance threshold, validate the positioning calculation by the said hybrid inertia method, and if the difference is greater than the said tolerance threshold, raise an alert.

According to another aspect, the invention relates to a computer program including executable code instructions which, when executed by a programmable electronic device, implement a method for controlling the positioning of a mounted information display device as briefly described above.

According to another aspect the invention relates to a non-volatile memory readable by a programmable electronic device, on which is recorded a computer program including executable code instructions which, when executed by a programmable electronic device, implements a method for controlling the positioning of a mounted information display device as briefly described above.

BRIEF DESCRIPTION OF THE DRAWINGS

Further features and advantages of the invention will be apparent from the description given below, by way of indication and not in any way limiting, with reference to the appended figures, among which.

DETAILED DESCRIPTION OF EMBODIMENTS

The invention will be described hereinafter more particularly in the field of avionics, but it is applicable in any safety-critical field of application, in which a user-mounted information display device is used.

Figure 1:
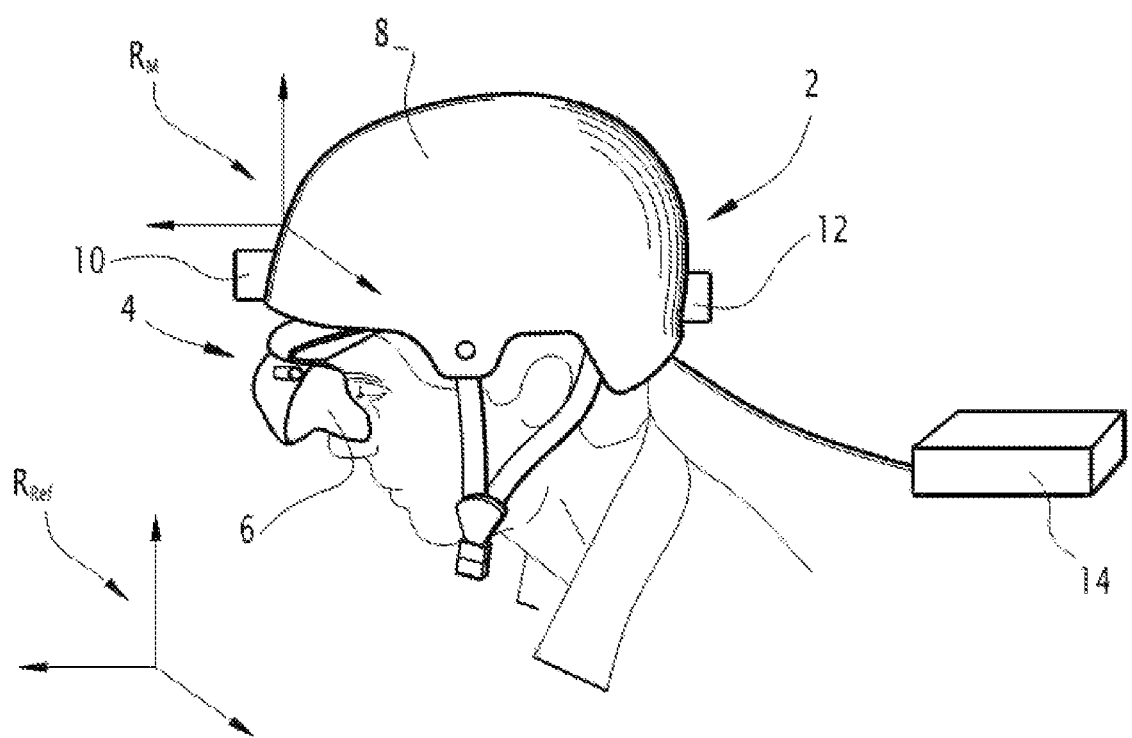
FIG. 1 is a schematic representation of a mounted display device in an application of the invention.

FIG. 1 represents schematically a user 2 equipped with a mounted information display device 4, which in this example is a head-up display device in the form of a mounted helmet 8, including a visualization screen 6, attached to the helmet 8.

The screen 6 is thus positioned in front of the eyes of the user.

The mounted information display device 4 is equipped with a sensor 10, called the main sensor, which is, in the illustrated embodiment, an image sensor, for example a 2D video camera, which has its own image acquisition frequency, for example of the order of 15 to 30 2D digital images per second.

According to one variant, the mounted information display device 4 includes several main sensors of the same nature, for example several video cameras.

According to a variant, the main sensor 10 is of another nature than an image sensor, it is for example a magnetic sensor or an electromagnetic wave sensor, or several such sensors.

The mounted information display device 4 is also equipped with an inertial sensor 12, also known as an IMU for "inertial measurement unit", for example a three-dimensional accelerometer or a gyroscope. The or each inertial sensor has its own data acquisition frequency, for example of the order of 200 Hz.

Alternatively, several inertial sensors 12 for example a set of three-dimensional accelerometers and gyroscopes are integrated into the mounted information display device 4.

Hereinafter, for ease of explanation, the system is considered to include a main sensor 10 and an inertial sensor 12.

In one embodiment, the main sensor 10 and the inertial sensor 12 provide physical synchronized measurements.

In addition, the device 4 includes or is directly connected to an electronic calculator device 14 which will be described in more detail below.

The device 4 is worn by a user 2 who is likely to move, in particular to turn his head. A reference frame $R_M$ is related to the device 4.

In order to produce a correct display on the screen 6, for example to produce an augmented reality type display with a superimposition of informative symbols on real images, it is useful to know the position, and in particular the orientation, of the referential $R_M$ related to the device 4 with respect to a reference frame $R_{Ref}$.

In one embodiment, the position of the frame $R_M$ in the reference frame $R_{Ref}$ is expressed by a 6-component vector, corresponding to three translational degrees of freedom and three rotational degrees of freedom.

The position of the center of the frame $R_M$ in the reference frame $R_{Ref}$ is defined by a translation vector ($x_M$, $y_M$, $z_M$).

The orientation of the frame $R_M$ with respect to the reference frame $R_{Ref}$ is defined by a 3-component orientation vector, which are angular values ($\phi$, $\theta$, $\Psi$). In other words, the orientation is represented by a vector of angular values.

Thus, the global positioning of the frame $R_M$ in the reference frame is defined by the 6-component vector ($x_M$, $y_M$, $z_M$, $\phi$, $\theta$, $\Psi$).

Hereafter, the terminology position calculation will be used for both orientation vector calculation and/or translation vector calculation.

In one embodiment, the user is an aircraft pilot, and the reference frame $R_{Ref}$ is a frame related to the aircraft cockpit. For the piloting application, which is a safety-critical application, it is foreseen to control and validate the position, over time (i.e. position tracking), and in particular the calculation of the orientation of the reference frame $R_M$, and consequently of the mounted information display device 4, in order to ensure that the displayed symbols are correctly positioned with respect to the field of vision of the pilot.

Figure 2:
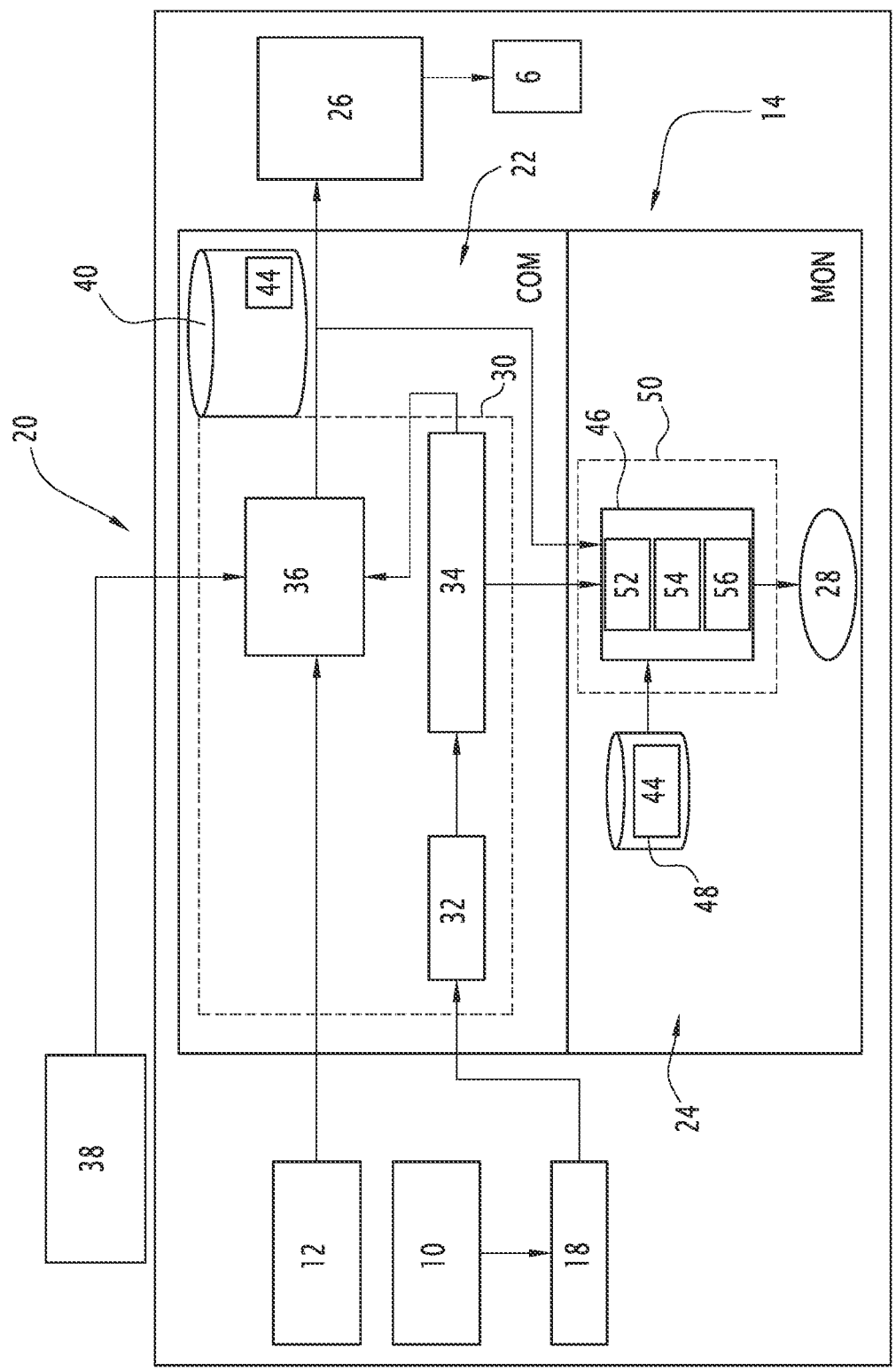
FIG. 2 illustrates a positioning system of a mounted display device including a positioning control device.

FIG. 2 is a functional block diagram of a system 20 for controlling the positioning of a mounted information display device in one embodiment.

The system 20 includes the sensors 10, 12 described above, for example an image sensor 10 and an inertial sensor 12, and the electronic calculator device 14.

The image sensor 10 is connected to a module 18 that performs serialization of acquired image sequences as binary data streams, with or without compression.

In the illustrated embodiment, the electronic calculator device 14 is integrated into the mounted information display device 4, for example in the helmet 8, for example in the form of electronic cards.

This electronic calculator device 14 comprises two separate hardware units 22 and 24, each including one or more calculating processors and one or more electronic memory units.

The first hardware unit 22 ("COM") performs, in particular, position calculations of the reference frame $R_M$, as a function of the data acquired by the sensors 10, 12, and sends these position data, in particular, to a processing unit 26 which generates the display of information on the screen 6 of the mounted information display device 4.

The second hardware unit 24 ("MON") implements a device for controlling the positioning, performing control calculations, in particular in order to validate the position calculations performed by the first hardware unit 22, or, if necessary, to raise the alerts 28.

In one embodiment, each hardware unit is implemented as a separate programmable electronic device, or by separate programmable logic circuits.

In one embodiment, the first hardware unit 22 includes a processor 30 configured to implement a de-serialization module 32, which allows the video image sequences to be obtained from the binary data stream received from the serialization module 18.

In addition, the processor 30 implements two modules 34, 36 that cooperate to implement a hybrid inertia method of calculating the position of the mounted information display device 4, and thus the related frame $R_M$, in the reference frame.

In the illustrated embodiment, the module 34 performs a position calculation in the reference frame, by a primary position calculation method, such as an optical method, which performs processing of images acquired by the image sensor 10. In particular, the position calculation module 34 uses spatial markers previously positioned in the reference frame, for example in the cockpit of an aircraft. The information 42 relating to the shape and position of each spatial marker is stored in an electronic memory 40 of the hardware unit 22. The position calculation module 34 implements spatial marker recognition and position estimation of the spatial markers in a plurality of images in the image sequence, thereby calculating an estimated position of the reference frame $R_M$.

The module 36 performs a so-called hybridization processing, to calculate a succession of positions of the reference frame $R_M$, from a position calculated by the module 34 at a calculation time instant, using the data acquired by the inertial sensor 12. Indeed, the inertial sensor 12 provides data with a higher acquisition frequency, and the determination of successive positions from the data of the inertial sensor makes it possible to accelerate the control of the positioning, and thus the position tracking of the mounted information display device.

In particular, the module 36 uses data supplied by a control system 38, the calibration data 44 allowing a pairing between the data obtained from the inertial sensor 12 and the data acquired by the main sensor 10. Indeed, the inertial sensor 12 provides data in a specific reference frame, for example an accelerometer provides data in a related three-dimensional reference frame.

Optionally, in particular in case of absence of time synchronization between the acquisition instants of the main sensor 10 and of the inertial sensor 12, a prediction is performed in addition to the hybridization, to predict a position of the reference frame $R_M$ at a time instant corresponding to a physical instant of inertial data acquisition from a position calculated by the module 34, corresponding to a physical instant of data acquisition by the main sensor.

In the illustrated embodiment, the hybrid inertia position calculation method is an opto-inertial method.

According to variants not shown, the mounted information display device is equipped with another type of main sensor, for example an electromagnetic magnetic sensor, and the system implements a magneto-inertial position calculation method.

For example, in one variant, the main sensor 10 is an electromagnetic wave sensor that senses a set of electromagnetic fields generated with known spatial attributes relative to the reference frame $R_{Ref}$, by a calibrated transmitting antenna positioned in the cockpit of the aircraft. The module 34 performs a position calculation, in particular the orientation of the reference frame $R_M$ in the reference frame. The hybridization process is implemented in a similar way by module 36.

The module 36 provides a succession of estimated positions of the mounted display device, in the reference frame $R_{Ref}$, these estimated positions allowing a tracking of the movement of the device 4 and a display of information adapted for a correct positioning in front of the eyes of the user. The estimated positions are transmitted to the processing unit 26 which generates the information display on the screen 6 of the mounted information display device 4.

In order to perform a control of the positioning of the mounted display device 4, the processor 50 of the second calculator unit 24 implements a control module 46.

This control module 46 implements a module 52 for obtaining and storing a first estimated position P1 of the device 4 at a reference time instant Tref, by the hybrid inertia method. The reference time instant Tref is a physical time instant of data capture, for example by the inertial sensor. The first estimated position is obtained at a first calculated time instant T1, which is later than Tref and depends on the execution speed of the hybrid inertia method. The first estimated position is stored, in relation to the reference time instant Tref, for example in an electronic memory 48 of the second calculator unit 24.

The control module 46 implements a module 54 for obtaining a second estimated position P2 of the device 4 at the same reference time instant Tref, obtained by the main position calculation method, based on the data acquired by the main sensor 10. Because of the latency of the calculations, the second estimated position at the reference time instant is obtained at a second calculation time instant T2 subsequent to the first calculation time instant T1.

Following the determination of the said second estimated position, the control module 46 implements a validation module 56 which implements a comparison of a difference between the first estimated position and the second estimated position with a predetermined tolerance threshold, and, as a function of the result of the comparison, a validation of the position determination by the hybrid inertial method or a raising of an alert 28.

For example, the alert is sent to the processing unit 26 which generates the display of information on the screen 6, which controls a modified display, depending on the criticality of the alert, for example controls the display of a predetermined alert symbol, allowing the pilot to be warned, or directly takes control of the generation of video to be displayed.

In one embodiment, the modules 52, 54 and 56 are implemented as software and form a computer program that implements a method for controlling the positioning in a reference frame according to one embodiment of the invention when executed by a processor of a programmable electronic device.

In one variant, not represented, the modules 52, 54, 56 are each implemented as a programmable logic component, such as an FPGA (Field Programmable Gate Array), a GPU (graphics processor) or a GPGPU (General-purpose processing on graphics processing), or as a dedicated integrated circuit, such as an ASIC (Application Specific Integrated Circuit).

Figure 3:
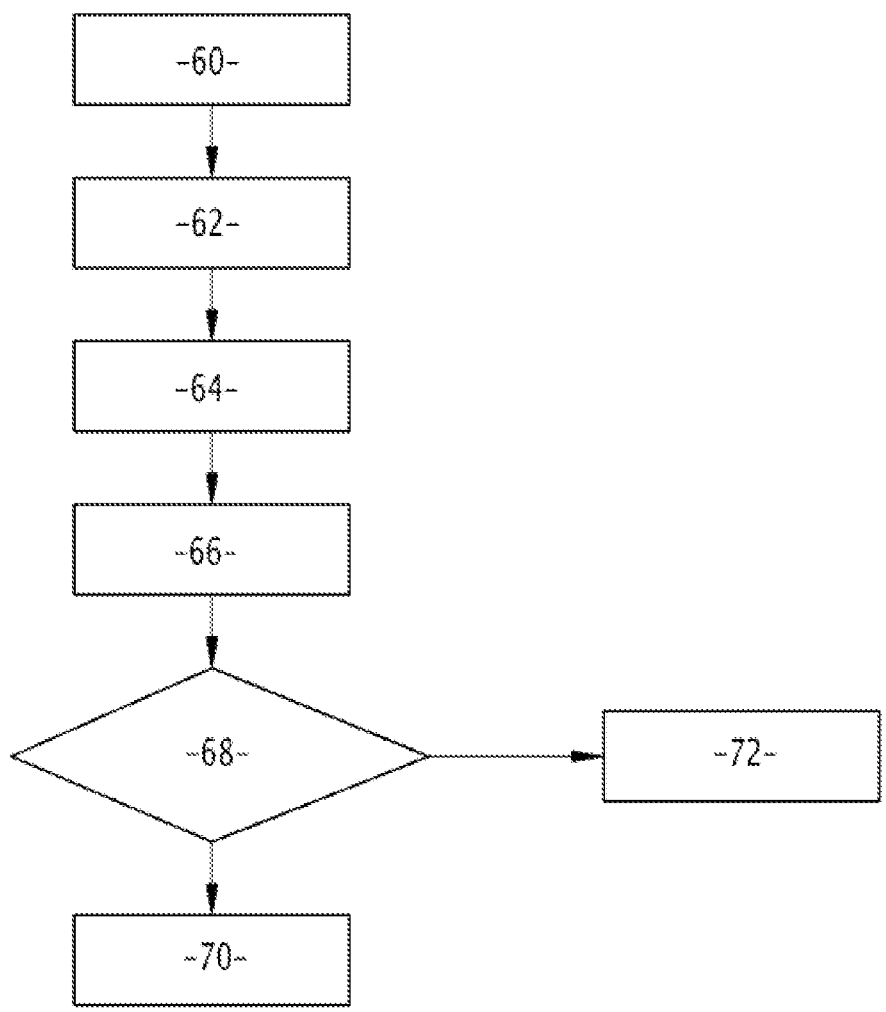
FIG. 3 is a synopsis of the main steps of a positioning control method according to one embodiment.

A synopsis of the main steps of one embodiment of a positioning control method according to one embodiment will be described below with reference to FIG. 3. A schematic temporal illustration is given in FIG. 4.

The embodiment described herein implements an opto-inertia position calculation method, but is similarly applicable to any hybrid inertia method.

The method comprises a step 60 of acquiring and storing a succession of positions, called first estimated positions, of the reference frame related to the mounted display device, estimated by an opto-inertia calculation method that implements a main position calculation method, by processing images acquired by the main sensor, which is an image sensor in this example, and a hybridization based on inertial data acquired by the inertial sensor.

Each first estimated position is related to a first time instant which is a physical instant of capture of the inertial data used for the calculation. For example, the inertial data are acquired with a first frequency, for example equal to 200 Hz.

Each estimated first position is obtained after a calculation latency time of the opto-inertia calculation method, for example of the order of 10 ms.

The first positions and the related first times are stored in a buffer memory.

Furthermore, the method comprises a step 62 of acquiring and storing positions, called second estimated positions, of the said device, by the main position calculation method, e.g. the image processing method, without hybridization. Each second estimated position is related to a second time instant which is a physical instant of capture, by the main sensor, of the images used for the calculation.

For example, the images are acquired with a second frequency, lower than the first frequency, for example equal to 20 Hz.

In the advantageous case where the acquisition of the data of the main sensor and the inertial sensor are synchronized, the second time instants are a subset of the first time instants.

Each estimated second position is obtained after a latency time computation of the image processing position calculation method, for example of the order of 75 ms.

The buffer memory is preferably sized according to the computational latencies of the position calculation methods used.

Figure 4:
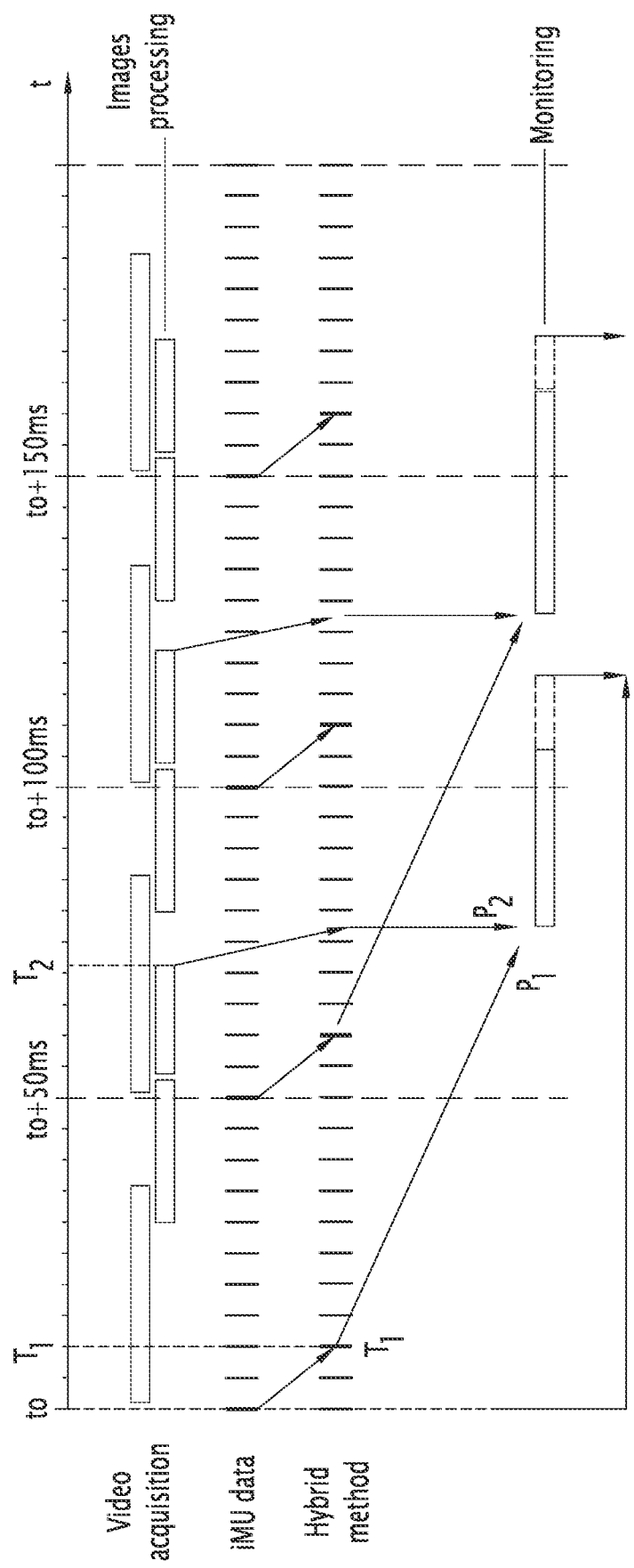
FIG. 4 schematically illustrates on time axes an example of synchronization between position calculation methods.

Thus, as can be understood from the illustration in FIG. 4, for a reference time instant Tref=$t_0$, a first position estimated by the opto-inertia method is obtained at the computation instant T1=$t_0$+10 ms, whereas a second position estimated by the position computation method by image processing for the reference time instant Tref=$t_0$ is obtained at the computation instant T2 later than T1.

Furthermore, the method implements a step 64 of selecting a reference time instant, and obtaining the first position P1 estimated at the reference time instant Tref by the hybrid inertia position calculation method. The reference time instant is selected among the first time instants.

Then, the second position P2 estimated, at the same reference time instant Tref, by the image processing position calculation method, is obtained at step 66.

Optionally, in case of absence of synchronization between the data acquisition of the main sensor and the inertial sensor, a synchronization, for example a prediction, is applied to determine the estimated positions at the same reference time instant Tref. For example, a prediction by Kalman filtering is applied. Alternatively, a derivation prediction of selected order is applied.

For example, in one embodiment, each estimated position is defined by a 3-component orientation vector.

Alternatively, each estimated position is defined by a 6-component vector, as explained above.

A difference between the two positions is calculated.

For example, when each position is defined by a 3-component orientation vector, a difference is calculated by a norm of the rotation matrix between orientations ($\phi_i, \theta_i, \Psi_i$), indicating an angular difference between the two orientation vectors (angular value vectors) corresponding to the first estimated position P1 and the second estimated position P2 respectively.

For example, when the position is defined by a translation vector, a difference is calculated by, for example, applying a squared distance between the translation vectors (xi, yi, zi) defining each position. Any other distance measurement is applicable.

For example, when the position is defined by a 6-component vector, the angular difference between the two orientation vectors and the squared distance between the translation vectors defining each position are calculated.

The difference is then compared to a predetermined tolerance threshold in the comparison step 68.

For example, the tolerance threshold for the angular difference is between 5 and 15 mRad (mili-radians).

For example, the tolerance threshold for the squared distance is between 5 and 20 mm for the squared distance.

If the difference between the first estimated position and the second estimated position is less than the tolerance threshold, the position calculation by the opto-inertia method is validated (step 70). Steps 64 to 68 are repeated for another reference time instant.

If the difference between the first estimated position and the second estimated position is greater than the tolerance threshold, an alert is raised in the alert raising step 72. For example, the alert raising consists of sending the alert to control a modified display, for example of a predetermined alert symbol, to warn the pilot.

Alternatively, the alert raising step 72 may consist of a state machine for defining an alert state as a function of the succession of the last results obtained over the last N cycles.

The method has been described more particularly in the case of an opto-inertia hybrid position calculation method, but it is similarly applicable for other hybrid inertia methods, in particular with a main position calculation method by processing data from an electromagnetic wave sensor, and an electromagnetic-inertial hybrid method.

The invention claimed is:

1. A method for controlling the positioning in a reference frame of a mounted information display device equipped with at least one main sensor and at least one inertial sensor, the control of the positioning implementing a hybrid inertia method including a position calculation by a main position calculation method using data acquired by the at least one main sensor and a determination of a succession of estimated positions using a position calculated by the main position calculation method and data acquired by the at least one inertial sensor, the method comprising, implemented by a calculator processor:
obtaining a first estimated position of the device at a reference time instant, the first estimated position being calculated by the hybrid inertia method, the first estimated position being obtained at a first calculation time instant T1, and storing the first estimated position in relation to the reference time instant,
obtaining a second estimated position of the device at the same reference time instant, calculated by the main position calculation method used by the hybrid inertia method, the second estimated position being obtained at a second time instant T2 subsequent to the first time instant T1,
following the obtaining of the second estimated position, comparing a difference between the first estimated position and the second estimated position to a predetermined tolerance threshold, and
if the difference is less than the tolerance threshold, validation of the positioning calculation by the hybrid inertia method, and
if the difference is greater than the tolerance threshold, raising an alert.

2. The method according to claim 1, wherein each of the first estimated position and second estimated position includes an orientation of a reference frame related to the mounted information display device in the reference frame expressed by a vector of angular values.

3. The method according to claim 2, wherein the difference between the first estimated position and the second estimated position is equal to a norm of a rotation matrix between a first vector of angular values representative of the first estimated position and a second vector of angular values representative of the second estimated position.

4. The method according to claim 1, wherein each of the first estimated position and second estimated position includes a translation of the center of a reference frame related to the mounted information display device in the reference frame expressed by a translation vector.

5. The method according to claim 1, implementing an acquisition of a succession of first estimated positions and related first time instants, and a storing of the first estimated positions and the related first time instants in a buffer memory.

6. The method according to claim 1, wherein the main sensor is an image sensor and wherein the main position calculation method implements a processing of images acquired by the image sensor, including an analysis of at least one image of a sequence of images acquired by the image sensor and a position calculation as a function of previously recorded positions of spatial markers previously arranged in the reference frame.

7. The method according to claim 1, wherein the main sensor is an electromagnetic wave sensor, and wherein the main position calculation method implements a position calculation by measuring electromagnetic fields related to a calibrated transmitting antenna positioned in the reference frame.

8. The method according to claim 1, further implementing a time prediction to predict a position of the mounted information display device at a time instant corresponding to a physical time instant of data acquisition by the main sensor from a position calculated by the hybrid inertia method.

9. A non-transitory computer readable medium having a computer program stored thereon including executable code instructions which, when executed by a programmable electronic device, implement a method for controlling the positioning of a mounted information display device according to claim 1.

10. A control device for controlling the positioning in a reference frame of a mounted information display device, equipped with at least one main sensor and at least one inertial sensor, the control of the positioning implementing a hybrid inertia method including a position calculated by a main position calculation method, using data acquired by the at least one main sensor and a determination of a succession of estimated positions using a position calculated by the main position calculation method and data acquired by the at least one inertial sensor the device comprising a calculator processor configured to implement:

a module for obtaining a first estimated position of the device at a reference time instant, the first estimated position being calculated by the hybrid inertia method, the first estimated position being obtained at a first calculation time instant T1, and storing the first estimated position in relation to the reference time instant, a module for obtaining a second estimated position of the device at the same reference time instant, calculated by the main position calculation method used by the hybrid inertia method, the second position being obtained at a second time instant T2 subsequent to the first time instant T1, a validation module configured to, following the obtaining of the second estimated position, compare a difference between the first estimated position and the second estimated position with a predetermined tolerance threshold, and if the difference is less than the tolerance threshold, validate the positioning calculation by the hybrid inertia method, and if the difference is greater than the tolerance threshold, raise an alert.

* * * * *